United States Patent [19]
Kawabata et al.

[11] Patent Number: 4,507,468

[45] Date of Patent: Mar. 26, 1985

[54] METHOD FOR PURIFYING POLYPHENYLENE SULFIDE

[75] Inventors: Juheiji Kawabata, Sakai; Toshio Inoue, Izumiohtsu; Toshinori Sugie, Takaishi; Fumihiro Kobata, Izumi, all of Japan

[73] Assignee: Dainippon Ink and Chemicals, Inc., Tokyo, Japan

[21] Appl. No.: 513,659

[22] Filed: Jul. 14, 1983

[30] Foreign Application Priority Data

Jul. 16, 1982 [JP] Japan ................................ 57-123001
May 26, 1983 [JP] Japan ................................ 58-93048
May 27, 1983 [JP] Japan ................................ 58-93405

[51] Int. Cl.$^3$ ............................................. C08G 75/14
[52] U.S. Cl. ................................................... 528/388
[58] Field of Search ........................................ 528/388

[56] References Cited

U.S. PATENT DOCUMENTS

3,354,129 11/1967 Edmonds, Jr. et al. ............ 528/265
3,919,177 11/1975 Campbell ............................ 528/265
4,071,509 1/1978 Edmonds, Jr. ...................... 528/388

FOREIGN PATENT DOCUMENTS

156342 12/1980 Japan .

*Primary Examiner*—Melvyn I. Marquis
*Attorney, Agent, or Firm*—Sherman & Shalloway

[57] ABSTRACT

A method for purifying polyphenylene sulfide containing impurities mainly comprising an electrolytic component, which comprises heat-treating said polyphenylene sulfide in an organic solvent in the presence of an oxyalkylene compound thereby to reduce the amount of said impurities.

15 Claims, No Drawings

METHOD FOR PURIFYING POLYPHENYLENE SULFIDE

This invention relates to a novel and useful method for purifying polyphenylene sulfide. More specifically, this invention relates to a method for purifying polyphenylene sulfide containing impurities which comprises heat-treating it in the presence of an oxyalkylene compound.

Polyphenylene sulfide (to be abbreviated as PPS hereinafter) is widely used to produce engineering plastics, films and fibers having excellent heat resistance and chemical resistance by injection molding, extrusion molding, etc.

Japanese Patent Publication No. 3368/1970 discloses a general process for producing PPS, which comprises reacting an aromatic halide such as p-dichlorobenzene with sodium sulfide in an organic amide solvent. Furthermore, Japanese Patent Publication No. 12240/1977 discloses an improved polymerization method for obtaining PPS having a high degree of polymerization, in which an alkali metal carboxylate is added as a polymerization promoter.

On the other hand, when such PPS is used as films, fibers or various electrical or electronic component parts, inorganic electrolytic impurities (also called ashes) such as sodium chloride contained in the polymer should desirably be minimized in order to retain the inherent moldability and electrical insulating property of PPS.

In particular, when PPS is used as a covering or sealing material for electronic component parts such as integrated circuits, transistors or condensers, electrodes, wirings, etc. of such component parts may undergo corrosion or breakage, and the leakage current increases undesirably. In order to prevent the occurrence of such a trouble, it is absolutely necessary to use PPS whose electrolytic impurities have been removed as much as possible.

According to the aforesaid process for producing PPS, the formation of by-product sodium chloride in substantially the same amount as the resulting polymer is inevitable. Consequently, when the polymer is subjected to ordinary treatments, a considerable amount of sodium chloride remains in the polymer. A resin composition obtained by using PPS containing a large amount of such electrolytic impurities has the defect of being much inferior in electrical properties to that containing PPS having small amounts of these impurities.

In an attempt to remove this defect and improve electrical properties, Japanese Laid-Open Patent Publication No. 156342/1980 discloses a method which comprises repeatedly boiling a PPS powder obtained by ordinary treatments, in deionized water for a long period of time to dissolve electrolytic components capable of being extracted with water from PPS, thereby minimizing the amount of impurities.

Investigations of the present inventors have shown that the aforesaid extraction by boiling in water is only time-consuming and the content of electrolytic impurities cannot be reduced as expected. The present inventors also traced a method disclosed in U.S. Pat. No. 4,071,509, which comprises heating a mixture of PPS and an alkali metal carboxylate or a lithium halide in an organic amide solvent, to reduce the content of inorganic components in PPS. But they have found that PPS purified by this method does not have a satisfactory purity as to be usable as a covering or sealing material for electronic component parts.

It is an object of this invention therefore to provide a useful purifying method for PPS, which is free from the defects of the conventional purifying methods.

In order to achieve this object, the present inventors have made extensive investigations. These investigations have led to the discovery that when an oxyalkylene compound is used as a treating agent for increasing the efficiency of purification, only impurities composed of electrolytic components containing a sodium ion can be removed without decomposition of PPS itself, and that the content of the inorganic impurities in PPS can be efficiently reduced within a very short period of time.

Thus, according to this invention, there is provided a method for purifying polyphenylene sulfide, which comprises heat-treating polyphenylene sulfide containing impurities consisting mainly of electrolytic components (such as NaCl) in the presence of an oxyalkylene compound (and optionally in the further presence of a metal salt of an organic carboxylic acid or a metal salt of an organic sulfonic acid).

PPS used in this invention which contains impurities composed mainly of electrolytic components is synthesized by ordinary reactions and contains at least 0.1% by weight of NaCl as an impurity. Such ordinary reactions include, for example, (1) the reaction of a halogen-substituted aromatic compound with an alkali sulfide (see U.S. Pat. No. 2,513,188, and Japanese Patent Publications Nos. 27671/1969 and 3368/1970), (2) condensation of a thiophenol in the presence of an alkali catalyst or a copper salt (see U.S. Pat. No. 3,274,165 and British Patent No. 1,160,660), and (3) condensation between an aromatic compound and sulfur chloride in the presence of a Lewis acid catalyst (see Japanese Patent Publication No. 27255/1971 and Belgian Pat. No. 29,437). Although there is no particular limitation on the amount of inorganic electrolytic impurities contained in PPS used in the invention, it is suitable that PPS usually contains at least 0.01% by weight, generally at least 0.1% by weight, of an electrolytic component such as a sodium ion.

Suitably, PPS has a melt index (MI) value, measured in accordance with the method of ASTM D1238-70 (measured at a temperature of 315.6° C. or 600° F. under a load of 5 kg), of not more than 10000 (g/10 minutes), or a logarithmic viscosity, as a measure of molecular weight, of at least 0.05.

Such PPS may have another component copolymerized therewith, or be partly branched, or be partly crosslinked, if it contains at least 70 mole%, preferably at least 90 mole%, of recurring units of the following formula.

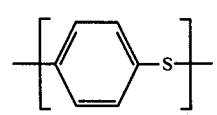

[II]

Typical examples of the comonomer units include trifunctional units such as ether units such as

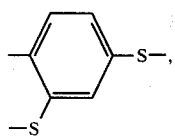

sulfone units such as

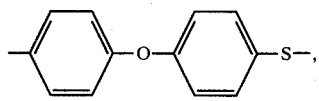

ketone units such as

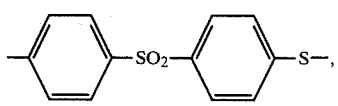

metal units such as

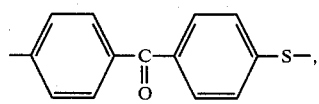

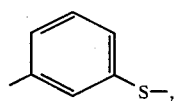

substituted sulfide units represented by the following general formula

[III]

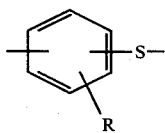

wherein R represents an alkyl, phenyl, alkoxy, carboxyl, amino, sulfone or nitro group.

The organic solvent used in this invention at least partly dissolves PPS, the oxyalkylene compound and the alkali metal salt of an organic acid optionally used, under the treating conditions in the method of this invention. Examples include organic amide solvents, aromatic solvents and polyol solvents.

The organic amide solvents are substantially liquid under the treating conditions in the method of this invention, and suitable organic amide solvents have 1 to 10 carbon atoms per molecule and are of cyclic or acyclic structure. Specific examples of the organic amide solvents are N-methylpyrrolidone, N-ethylpyrrolidone, N,N-dimethylformamide, N,N-dimethylacetamide, 2-pyrrolidone, formamide, acetamide, epsilon-caprolactam, N-methylcoprolactom, tetramethylurea or 1,3-dimethyl-2-imidazolidinone. N-methylpyrrolidone is especially preferred.

The aromatic solvents are substantially liquid under the treating conditions in the method of this invention, and include aromatic hydrocarbons, aromatic alcohols, aromatic ethers, halogenated aromatic ethers, aromatic nitriles, aromatic ketones and aromatic amines containing at least one aromatic nucleus per molecule. Specific examples are aromatic hydrocarbons such as toluene, xylene, ethylbenzene, naphthalene, tetralin, cumene, diphenyl and triphenyl; aromatic alcohols such as benzyl alcohol, phenol, cresol, and p-chlorophenol; aromatic ethers such as benzyl ethyl ether, anisole, ethylphenyl ether and diphenyl ether; halogenated aromatic hydrocarbons such as fluorobenzene, chlorobenzene, 1-chloronaphthalene and dichlorobenzene; aromatic nitriles such as benzonitrile; aromatic ketones such as benzophenone; and aromatic amines such as quinoline. They may be used in combination with each other. Diphenyl ether is especially preferred.

Suitable polyol solvents usually contain at least two hydroxyl groups per molecule and 2 to 6 carbon atoms, and are liquid under the treating conditions in the method of this invention. Specific examples of such solvents include ethylene glycol, propylene glycol, trimethylene glycol, 1,3-butanediol, 2-butene-1,4-diol, glycerol, neopentyl glycol, diethylene glycol, triethylene glycol, trimethylolpropane and trimethylolethane. They may be used in combination with each other. Glycerol is especially preferred.

The suitable amount of the organic solvent is 0.5 to 500 parts by weight, preferably 1 to 100 parts by weight, per part by weight of PPS.

Preferred oxyalkylene compounds for use in the method of this invention include compounds of the general formula

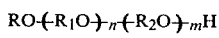 [A]

wherein
R represent an alkyl group having 1 to 40 carbon atoms, preferably 8 to 30 carbon atoms, or an aryl group having 6 to 50 carbon atoms, preferably 14 to 30 carbon atoms, (provided that an oxyalkylene group is not ring-substituted at the aryl group),
$R_1$ and $R_2$ represent an alkylene group having 2 to 4 carbon atoms, n and m are 0 or an integer of 1 or more, provided that the sum of n and m is at least 1, preferably 5 to 60,
and compounds of the following general formula

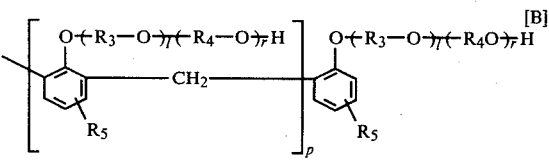 [B]

wherein $R_3$ and $R_4$ represent an alkylene group having 2 to 4 carbon atoms, $R_5$ represents a hydrogen atom, an alkyl group having 1 to 30 carbon atoms, or an aryl group, l and r are 0 or an integer of up to 90, preferably 3 to 20, provided that the sum of l and r is an integer of 1 to 90, preferably 4 to 30, and p is an integer of 2 to 50, perferably 2 to 10.

Above all, polyoxyalkylene compounds are preferred.

Typical examples of the oxyalkylene compounds of general formula [A] include polyoxyalkylene glycols having a number averaged molecular weight (to be referred to simply as "molecular weight" hereinafter) of at least 150 such as polyoxyethylene glycol or polyoxypropylene glycol, and nonionic surface-active agents obtained by etherifying or esterifying the terminal hydroxyl groups of these glycols with $C_1$–$C_{30}$ alkyl groups and/or aryl groups. Examples of especially preferred species are polyoxyethylene monooctyl ether, polyoxyethylene monolauryl ether, polyoxyethylene monoctylphenyl ether, polyoxyethylene polyoxypropylene monooctylphenyl ether, polyoxyethylene monolauryl ester, polyoxypropylene monooctyl ether, polyoxypropylene monolauryl ether, polyoxypropylene monooctylphenyl ether, polyoxypropylene monononylphenyl ether, polyoxypropylene monolauryl ester, and mixtures of at least two of these.

The oxyalkylene compounds may also include crown ether compounds such as 15-crown-5, 18-crown-6, dibenzo-18-crown-6, dicyclohexyl-18-crown-6, dibenzo-24-crown-8 and dicyclohexyl-24-crown-8.

Examples of the oxyalkylene compounds expressed by general formula [B] are those in which $R_3$ and $R_4$ are —$CH_2CH_2$,

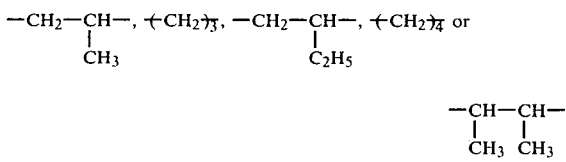

and $R_5$ is a hydrogen atom, an alkyl group such as a methyl, ethyl, butyl, octyl, nonyl, dodecyl, cetyl, 10-methylheptyl, 2-ethylhexyl, or 1-methyl-4-ethyloctyl group, an alkylaryl group such as an ethylphenyl, dodecylphenyl or nonylphenyl group, or an aryl group such as a phenyl or naphthyl group. Specific examples include polyoxyethylenephenyl formaldehyde condensate, polyoxyethylenemethylphenyl formaldehyde condensate, polyoxyethylenenonylphenyl formaldehyde condensate, polyoxyethylenecetylphenyl formaldehyde condensate, polyoxypropylenemethylphenyl phenyl formaldehyde condensate, polyoxypropylenenonylphenyl formaldehyde condensate, polyoxybutylenenonylphenyl formaldehyde condensate, oxyethylenephenol formaldehyde condensate and oxyethylenenonylphenol formaldehyde condensate.

The suitable amount of the oxyalkylene compound is 0.01 to 200% by weight, preferably 0.5 to 100% by weight, based on PPS.

If required, in the practice of the method of this invention, an alkali metal salt of an organic acid may be added to prevent decomposition of PPS and to increase the molecular weight of PPS. Typical examples of this metal salt are compounds of the following general formula

wherein $R_6$ represents a hydrocarbon group having 1 to 30 carbon atoms, X represents —COOM and/or —$SO_3M$ in which M is at least one alkali metal selected from Li, Na, K, Rb and Cs, and g is an integer of 1 to 4.

Especially preferred examples of such metal salts are lithium acetate, sodium acetate, sodium benzoate, sodium benzenesulfonate, sodium p-toluenesulfonate, sodium alpha-naphthalene sulfonate, disodium succinate, disodium adipate, disodium phthalate, trisodium sulfophthalate, disodium naphthalenedisulfonate, and trisodium trimellitate. These alkali metal salts may be anhydrous salts or hydrates.

Alkali metal carbonates such as lithium carbonate and sodium carbonate, and alkali metal halides such as lithium chloride and lithium bromide may also be used. These compounds may be used in combination with the aforesaid alkali metal salts of organic acids.

The suitable amount of the alkali metal salt of organic acid is 0.05 to 4 moles, preferably 0.1 to 2 moles, per 100 g of PPS.

The method of this invention may also be applied to PPS of various kinds mentioned above and also blends of PPS with other various polymers. Typical examples of such other polymers are polysulfone, polyether sulfone, polyphenylene oxide, polyether ether ketone, polycarbonate, polyethylene, polyamides, polyesters, polyimides and polyethers.

In a preferred embodiment of the method of this invention, PPS containing inorganic electrolytic components containing, for example, at least 1% by weight of a sodium ion is heat-treated in the organic solvent together with the oxyalkylene compound (and as required, a mixture of it with the organic acid metal salt) at a temperature of usually 150° to 350° C., preferably 200° to 280° C., for usually 0.1 to 10 hours, preferably 0.5 to 4 hours, with stirring. The pressure of the system may be within a range sufficient to maintain the organic solvent in the liquid phase, and can be suitably selected. After the heat-treatment, the mixture is filtered after optional dilution with water, washed with water and then dried. If desired, prior to washing with water, the organic amide solvent is recovered from the mixture by distillation and/or flushing. This results in the isolation of PPS of high purity having a very much reduced sodium ion content without causing a decrease in the molecular weight of PPS.

PPS obtained by the method of the present invention, as described hereinabove, can retain its inherent good electrical insulating property because it scarcely contains impurities composed of inorganic electrolytic components such as sodium chloride and is of very high purity. Accordingly, the PPS can be utilized for obtaining various kinds of molded articles including not only films and fibers but also electrical or electronic component parts. In particular, since the PPS scarcely contains electrolytic components which will corrode electrodes or wiring portions of electronic component parts, it is very useful as a coating or sealing material for various electronic component parts such as integrated circuits, transistors, diodes, thyristors, coils, varistors, connectors, resistors and condensers and assemblies of these electronic components.

The following Examples and Comparative Examples illustrate the present invention specifically.

The logarithmic viscosity of PPS in each of these examples is a value obtained by measuring the viscosity of a solution of 0.4 g of the polymer in 100 ml of alpha-chloronaphthalene at 206° C. (403° F.), determining the relative viscosity value on the basis of the measured viscosity value, and dividing the natural logarithm of the relative viscosity value by the concentration of PPS.

The sodium ion content of PPS in each of the examples was measured as follows:

PPS powder (150–500 mg) was taken into a 50 ml Kjeldahl flask, and 10 ml of deionized water and 5 ml of sulfuric acid adapted for precision analysis were added. The flask was shaken well, and then zeolite was put into it to perform thermal decomposition (at which time the mixture became blackish brown as the decomposition proceeded). When evolution of gas was no longer observed, the mixture was cooled, and then 2 or 3 drops of perchloric acid were added to perform thermal decomposition further. Thus, until the decomposed mixture became a colorless transparent solution, the above procedure was repeated to decompose the sample completely. After the decomposition, the solution was cooled. The contents of the flask were washed into a 50 ml measuring flask and diluted to an indicator line to prepare a test solution. The flame light intensity at 589 nm of the test solution was measured by an atomic absorptiometer using an atmosphere of nitrogen suboxide gas and an acetylene flame. The result was checked against a calibration curve made in advance using a standard solution of sodium chloride, thereby to calculate the sodium ion content of PPS.

EXAMPLE 1

A 5-liter autoclave equipped with a stirrer was charged with 1993 g of N-methylpyrrolidone, 537 g (4.1 moles) of sodium sulfide 2.7-hydrate, 1.6 g (0.04 mole) of sodium hydroxide and 144 g (1.0 mole) of sodium benzoate. The temperature was gradually raised with stirring over the course of about 2 hours in an atmosphere of nitrogen until it reached 200° C. Thus, 102 ml of water was distilled off.

Thereafter, the reaction system was cooled to 150° C., and 603 g (4.1 moles) of p-dichlorobenzene and 250 g of N-methylpyrrolidone were added. The reaction was carried out at 230° C. for 2 hours and then at 260° C. for 3 hours. At the end of the polymerization reaction, the pressure of the inside of the autoclave was 9.0 kg/cm$^2$.

The autoclave was then cooled, and the contents were filtered. The cake (solid) was washed with hot water three times and then with acetone two times, and dried at 120° C. to give 412 g of PPS as pale grayish brown granules (yield 93%).

The resulting PPS had a logarithmic viscosity value of 0.27 and a sodium ion content of 1230 ppm.

Then, a 1-liter autoclave equipped with a stirrer was charged with 20 g of the resulting PPS, 2.0 g of polyoxyethylene monooctylphenyl ether having an average molecular weight of 646, 26.6 g (0.185 mole) of sodium benzoate and 200 g of N-methylpyrrolidone. The temperature was raised in an atmosphere of nitrogen, and with stirring, the mixture was heated at 265° C. for 2 hours. At the end of the heating, the pressure of the inside of the autoclave was 2.8 kg/cm$^2$.

The autoclave was then cooled, and the contents were filtered. The cake (solid) was washed with hot water three times and then with acetone two times. Thus, 20 g of the polymer was recovered. The polymer had a logarithmic viscosity value of 0.31 and a sodium ion content of 18 ppm.

It is thus seen that according to the method of this invention, the content of impurities containing a sodium ion in PPS can be greatly reduced, and no decomposition of the polymer occurs but rather its molecular weight increases favorably.

EXAMPLE 2

The same procedure as in Example 1 was repeated except that sodium benzoate was not used in the step of purifying the polymer obtained by polymerization. The polymer finally obtained had a logarithmic viscosity value of 0.25 and a sodium ion content of 20 ppm.

This means that the same effect as in Example 1 can be expected even in the absence of sodium benzoate, and the method of this invention is superior.

COMPARATIVE EXAMPLE 1

The same procedure as in Example 1 was repeated except that both the polyoxyethylene monooctylphenyl ether and sodium benzoate were not used in the step of purifying the polymer obtained by polymerization. The polymer finally obtained had a logarithmic viscosity value of as low as 0.17 and a sodium ion content of as high as 570 ppm.

COMPARATIVE EXAMPLE 2

The same procedure as in Example 1 was repeated except that the polyoxyethylene monooctylphenyl ether was not used in the step of purifying the polymer obtained by polymerization. The polymer finally obtained had a logarithmic viscosity value of 0.29 but a sodium ion content of as high as 590 ppm. The extent of purification was therefore still unsatisfactory.

EXAMPLES 3 TO 14 AND COMPARATIVE EXAMPLE 3

The same polymerization reaction as in Example 1 was carried out except that 418 g (4.1 moles) of lithium acetate dihydrate was used instead of sodium benzoate, 1.8 g (0.01 mole) of 1,2,4-trichlorobenzene was added as a polyhalogenated aromatic compound and the amount of N-methylpyrrolidone was changed to 310 g. The amount of water distilled off during this time was 250 ml, and at the end of the polymerization, the pressure of the inside of the autoclave was 9.6 kg/cm$^2$. There was obtained 394 g (yield 89%) of PPS as pale grayish brown granules. The PPS had a logarithmic viscosity value of 0.34 and a sodium ion content of 860 ppm.

In Example 3, the resulting PPS was treated in the same way as in Example 1. In Examples 4 to 14, the PPS was treated in the same way as in Example 1 except that the compounds shown in Table 1 were used respectively in the amounts indicated. In Comparative Example 3, the PPS was treated in the same way as in Comparative Example 1.

The results are shown in Table 1.

TABLE 1

| | Oxyalkylene compound | | | Alkali metal salt | | Properties of the final polymer | |
| --- | --- | --- | --- | --- | --- | --- | --- |
| | Compound's name | Molecular weight | Amount (g) | Compound's name | Amount (g) | Logarithmic viscosity value (dl/g) | Na$^+$ content (ppm) |
| Examples | | | | | | | |
| 3 | Polyoxyethylene monooctylphenyl ether | 646 | | Sodium benzoate | 26.6 | 0.37 | 17 |
| 4 | Polyoxyethylene monononylphenyl ether | 352 | | | | 0.36 | 15 |
| 5 | | 2420 | | | | 0.37 | 17 |
| 6 | Polyoxyethylene monolauryl ether | 538 | | | | 0.36 | 26 |

TABLE 1-continued

| | Oxyalkylene compound | | | Alkali metal salt | | Properties of the final polymer | |
| --- | --- | --- | --- | --- | --- | --- | --- |
| | Compound's name | Molecular weight | Amount (g) | Compound's name | Amount (g) | Logarithmic viscosity value (dl/g) | Na+ content (ppm) |
| 7 | Polyoxyethylene monostearyl ether | 1150 | | | | 0.36 | 24 |
| 8 | Polyethylene glycol-700(*) | 700 | | | | 0.34 | 45 |
| 9 | Polyoxypropylene monooctylphenyl ether | 786 | | | | 0.36 | 20 |
| 10 | Polyoxyethylene polyoxypropylene copolymer monooctylphenyl ether (oxyethylene/oxypropylene = 1:1 mole) | 716 | 2.0 | | | 0.36 | 18 |
| 11 | Dibenzo-18-crown-6-ether | 360 | | Not used | | 0.32 | 42 |
| 12 | Polyoxyethylene monooctylphenyl ether | 646 | | Lithium acetate dihydrate | 18.9 | 0.32 | 20 |
| 13 | | | | Lithium chloride | 7.9 | 0.35 | 17 |
| 14 | | | | Sodium carbonate monohydrate | 23.1 | 0.31 | 22 |
| Comparative Example 3 | Not used | | | Not used | | 0.25 | 410 |

(*)Polyethylene glycol made by Nippon Oils and Fats Co., Ltd.

EXAMPLES 15 TO 19

The procedure of Example 1 was repeated except that the type and amount of the solvent and the oxyalkylene compound were changed as shown in Table 2. The results are shown in Table 2.

TABLE 2

| | Solvent | | Oxyalkylene compound | | | Properties of the final polymer | |
| --- | --- | --- | --- | --- | --- | --- | --- |
| Example | Compound | Amount (g) | Compound's name | Molecular weight | Amount (g) | Logarithmic viscosity value (dl/g) | Na+ content (ppm) |
| 15 | Diphenyl ether | 200 | Polyoxyethylene monooctylphenyl ether | 646 | 2.0 | 0.37 | 8 |
| 16 | Diphenyl ether | 200 | Polyoxyethylene monononylphenyl ether | 2420 | 2.0 | 0.36 | 10 |
| 17 | Diphenyl ether | 400 | Polyethylene glycol | 700 | 4.0 | 0.34 | 18 |
| 18 | Diphenyl | 200 | Polyoxyethylene monooctylphenyl ether | 646 | 2.0 | 0.37 | 11 |
| 19 | Glycerol | 200 | Polyoxyethylene monooctylphenyl ether | 646 | 2.0 | 0.35 | 17 |

EXAMPLE 20

A 1-liter autoclave equipped with a stirrer was charged with 20 g of the PPS obtained in Example 1, 26.6 g (0.185 mole) of sodium benzoate, 200 g of N-methylpyrrolidone, and 20 g of a polyoxyethylene nonylphenyl formaldehyde condensate of the formula

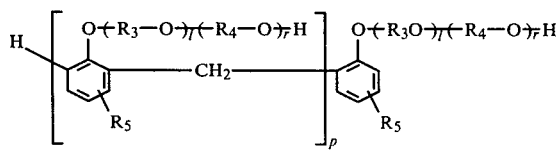

wherein $R_3$ is $-CH_2CH_2-$, $R_5$ is $-C_9H_{19}$, p is 3, l is 8, and r is 0.

The temperature was raised in an atmosphere of nitrogen, and the mixture was heated at 265° C. for 2 hours with stirring. At the end of the heating, the internal pressure of the autoclave was 2.8 kg/cm².

The autoclave was then cooled, and the contents were separated by filtration. The cake (solid) was washed with hot water three times and then with acetone two times. Thus, 20 g of the polymer was recovered. The polymer had a logarithmic viscosity value of 0.29, and a sodium ion content of 12 ppm.

It is seen therefore that according to the method of this invention, the content of impurities containing a sodium ion in PPS can be greatly reduced, and no decomposition of the polymer occurs but rather its molecular weight is increased favorably.

EXAMPLE 21

The same procedure as in Example 20 was repeated except that sodium benzoate was not used in the step of purifying the polymer in Example 20. The polymer finally obtained had a logarithmic viscosity value of 0.24 and a sodium ion content of 8 ppm.

This shows that the same effect as in Example 20 can be expected even in the absence of sodium benzoate.

EXAMPLES 22 TO 33

The same polymerization as in Example 1 was carried out except that 418 g (4.1 moles) of lithium acetate dihydrate was used instead of sodium benzoate, 1.8 g (0.01 mole) of 1,2,4-trichlorobenzene was added as a polyhalogenated aromatic compound, and the amount of N-methylpyrrolidone was increased to 310 g. The amount of water distilled off during this time was 250 ml, and the pressure of the inside of the autoclave at the end of the polymerization was 9.6 kg/cm². There was obtained 394 g (yield 89%) of PPS as pale grayish brown granules. The PPS obtained had a logarithmic viscosity value of 0.34 and a sodium ion content of 860 ppm.

The resulting PPS was purified in the same way as in Example 20 except that the compounds indicated in Table 3 were used repectively in the amounts indicated. The results are shown in Table 3.

EXAMPLES 34 TO 39

The procedure of Example 1 was repeated except that the types and amounts of the solvent and the oxyalkylene compound were changed as shown in Table 4. The results are shown in Table 4.

TABLE 3

Oxyalkylene compound:

$$H \underset{R_5}{\underset{|}{\bigcirc}}\left[\begin{array}{c}O(R_3O)_{\overline{q}}(R_4O)_{\overline{r}}H \\ CH_2 \end{array}\right]_p \underset{R_5}{\underset{|}{\bigcirc}} O(R_3O)_{\overline{q}}(R_4O)_{\overline{r}}H$$

| Example | $R_3$ | $R_4$ | $R_5$ | P | q | r | Amount (g) |
|---|---|---|---|---|---|---|---|
| 22 | $-CH_2CH_2-$ | — | $-C_9H_{19}$ | 3 | 8 | 0 | 2.0 |
| 23 | " | — | " | " | " | " | " |
| 24 | " | — | " | " | 16 | " | " |
| 25 | " | — | " | " | 8 | " | " |
| 26 | " | — | " | " | " | " | " |
| 27 | " | — | " | " | " | " | " |
| 28 | " | — | " | 6 | 16 | " | " |
| 29 | " | — | " | " | " | 0 | " | 4.0 |
| 30 | " | — | $-CH_3$ | 3 | 8 | " | " |
| 31 | " | — | $-C_{16}H_{33}$ | " | " | " | 2.0 |
| 32 | $-CH_2CH- \\ \phantom{-}\; \mid \\ \phantom{-}CH_3$ | — | $-C_9H_{19}$ | " | " | " | " |
| 33 | $-CH_2CH_2-$ | $-CH_2CH_2CH_2-$ | " | " | " | 4 | " |

| Example | Alkali metal salt Compound's name | Amount (g) | Properties of the final polymer Logarithmic viscosity value (dl/g) | $Na^+$ content (ppm) |
|---|---|---|---|---|
| 22 | Sodium benzoate | 13.3 | 0.36 | 10 |
| 23 | — | — | 0.24 | 8 |
| 24 | Sodium benzoate | 13.3 | 0.36 | 5 |
| 25 | Lithium acetate dihydrate | 9.4 | 0.37 | 7 |
| 26 | Sodium acetate | 7.5 | 0.34 | 18 |
| 27 | Lithium chloride | 3.9 | 0.35 | 15 |
| 28 | Sodium carbonate monohydrate | 11.4 | 0.32 | 24 |
| 29 | Sodium benzoate | 13.3 | 0.36 | 38 |
| 30 | Sodium p-toluenesulfonate | 17.9 | 0.36 | 26 |
| 31 | Sodium benzoate | 13.3 | 0.36 | 12 |
| 32 | Sodium benzoate | " | 0.36 | 23 |
| 33 | Sodium benzoate | " | 0.36 | 18 |

TABLE 4

Oxyalkylene compound:

$$H \underset{R_5}{\underset{|}{\bigcirc}}\left[\begin{array}{c}O(R_3O)_{\overline{q}}(R_4O)_{\overline{r}}H \\ CH_2 \end{array}\right]_p \underset{R_5}{\underset{|}{\bigcirc}} O(R_3O)_{\overline{q}}(R_4O)_{\overline{r}}H$$

| Example | Solvent Compound | Amount (g) | $R_3$ | $R_4$ | $R_5$ | P | q | r | Amount (g) | Properties of the final polymer Logarithmic viscosity value (dl/g) | $Na^+$ content (ppm) |
|---|---|---|---|---|---|---|---|---|---|---|---|
| 34 | Diphenyl ether | 200 | $-CH_2CH_2-$ | — | $-C_9H_{19}$ | 3 | 8 | 0 | 2.0 | 0.36 | 5 |
| 35 | Diphenyl ether | " | " | — | " | 6 | 16 | " | " | 0.36 | 7 |
| 36 | Diphenyl ether | " | " | — | $-C_{16}H_{33}$ | 3 | 8 | " | " | 0.35 | 7 |

TABLE 4-continued

| | Solvent | | Oxyalkylene compound 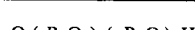 | | | | | | | Properties of the final polymer | |
|---|---|---|---|---|---|---|---|---|---|---|---|
| Example | Compound | Amount (g) | R$_3$ | R$_4$ | R$_5$ | P | l | r | Amount (g) | Logarithmic viscosity value (dl/g) | Na$^+$ content (ppm) |
| 37 | Diphenyl | " | —CH$_2$—CH(CH$_3$)— | — | —C$_9$H$_{19}$ | 3 | 8 | " | 4.0 | 0.34 | 10 |
| 38 | 1-Chloronaphthalene | " | —CH$_2$CH$_2$— | — | " | 3 | 8 | " | 2.0 | 0.37 | 8 |
| 39 | Glycerol | " | —CH$_2$CH$_2$— | — | " | 3 | 8 | " | " | 0.34 | 14 |

What is claimed is:

1. A method for purifying polyphenylene sulfide containing impurities mainly comprising an inorganic electrolytic component, which comprises heat-treating at a temperature of 150° C. to 350° C. said polyphenylene sulfide in an organic solvent in the presence of an oxyalkylene compound which is selected from the group consisting of a compound represented by the general formula RO—(R$_1$O)$_n$(R$_2$O)$_m$H 

wherein R represents a hydrogen atom, an alkyl group having 1 to 40 carbon atoms, or an aryl group having 6 to 50 carbon atoms, and R$_1$ and R$_2$ represent an alkylene group having 2 to 4 carbon atoms, and n and m are 0 or integers of at least 1 provided that the sum of n and m is at least 1, and a compound represented by the general formula

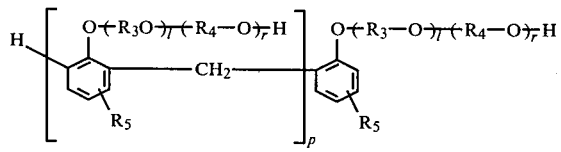

wherein R$_3$ and R$_4$ represent an alkylene group having 2 to 4 carbon atoms, R$_5$ represents a hydrogen atom, an alkyl group having 1 to 30 carbon atoms or an aryl group, l and r are 0 or integers of up to 90 provided that the sum of l and r is an integer of 1 to 90, and p is an integer of 2 to 50, the amount of the oxyalkylene compound being 0.01 to 200% by weight based on said polyphenylene sulfide containing said impurities, thereby to reduce the amount of said impurities.

2. The method of claim 1 wherein the organic solvent is an organic amide solvent.

3. The method of claim 1 wherein the organic solvent is an aromatic solvent.

4. The method of claim 1 wherein the organic solvent is a polyol solvent selected from the group consisting of ethylene glycol, propylene glycol, trimethylene glycol, 1,3-butanediol, 2-butene-1,4-diol, glycerol, neopentyl glycol, trimethylolpropane and trimethylolethane.

5. The method of claim 1 wherein the oxyalkylene compound is a compound represented by the general formula RO—(R$_1$O)$_n$(R$_2$O)$_m$H 

wherein R represents a hydrogen atom, an alkyl group having 1 to 40 carbon atoms, or an aryl group having 6 to 50 carbon atoms, and R$_1$ and R$_2$ represent an alkylene group having 2 to 4 carbon atoms, and n and m are 0 or integers of at least 1 provided that the sum of n and m is at least 1.

6. The method of claim 1 wherein the oxyalkylene compound is a compound represented by the general formula

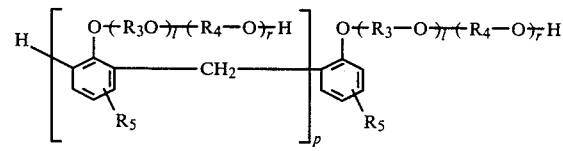

wherein R$_3$ and R$_4$ represent an alkylene group having 2 to 4 carbon atoms, R$_5$ represents a hydrogen atom, an alkyl group having 1 to 30 carbon atoms, or an aryl group, l and r are 0 or integers of up to 90 provided that the sum of l and r is an integer of 1 to 90, and p is an integer of 2 to 50.

7. The method of claim 1 wherein said electrolytic component as an impurity is sodium chloride.

8. A method for purifying polyphenylene sulfide containing impurities mainly comprising an inorganic electrolytic component which comprises heat-treating at a temperature of 150° C. to 350° C. said polyphenylene sulfide in an organic solvent in the presence of an oxyalkylene compound which is selected from the group consisting of a compound represented by the general formula RO—(R$_1$O)$_n$(R$_2$O)$_m$H 

wherein R represents a hydrogen atom, an alkyl group having 1 to 40 carbon atoms, or an aryl group having 6 to 50 carbon atoms, and R$_1$ and R$_2$ represent an alkylene group having 2 to 4 carbon atoms, and n and m are 0 or integers of at least 1 provided that the sum of n and m is at least 1, and a compound represented by the general formula

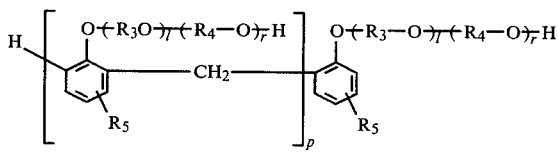

wherein $R_3$ and $R_4$ represent an alkylene group having 2 to 4 carbon atoms, $R_5$ represents a hydrogen atom, an alkyl group having 1 to 30 carbon atoms, or an aryl group, and r are 0 or integers of up to 90 provided that the sum of l and r is an integer of 1 to 90, and p is an integer of 2 to 50, the amount of the oxyalkylene compound being 0.01 to 200% by weight based on said polyphenylene sulfide containing said impurities, and in the presence of a metal salt represented by the general formula $$R_6\text{-}(X)_g$$

wherein $R_6$ represents a hydrocarbon group having 1 to 30 carbon atoms, X represents —COOM and/or —SO$_3$M in which M represents at least one alkali metal selected from the group consisting of Li, Na, K, Rb and Cs, and g is an integer of 1 to 4, provided that when $R_6$ is a hydrocarbon group having one carbon atom, g is 1, the amount of said metal salt being 0.05 to 4 moles per 100 g of said polyphenylene sulfide containing said impurities, thereby to reduce the amount of said impurities.

9. The method of claim 1 or 8 wherein the treating time is 0.1 to 10 hours.

10. The method of any one of claims 5 or 6 wherein the polyphenylene sulfide is heat-treated in the organic solvent in the presence of the oxyalkylene compound and a metal salt represented by the general formula $$R_6\text{-}(X)_g$$

wherein $R_6$ represents a hydrocarbon group having 1 to 30 carbon atoms, X represents —COOM and/or —SO$_3$M in which M represents at least one alkali metal selected from the group consisting of Li, Na, K, Rb and Cs, and g is an integer of 1 to 4, provided that when $R_6$ is a hydrocarbon group having one carbon atom, g is 1.

11. The method of claim 1 wherein the amount of the organic solvent is 1 to 100 parts by weight, per part by weight of the polyphenylene sulfide and wherein the amount of the polyoxyethylene compound is from 0.5 to 100% by weight, based on the polyphenylene sulfide.

12. The method of claim 5 wherein the oxyalkylene compound has a number average molecular weight of at least 150 and is selected from the group consisting of polyoxyethylene monooctyl ether, polyoxyethylene monolauryl ether, polyoxyethylene monooctyl phenyl ether, polyoxyethylene polyoxypropylene monooctylphenyl ether, polyoxyethylene monolauryl ester, polyoxypropylene monooctyl ether, polyoxypropylene monolauryl ether, polyoxypropylene monooctyl phenyl ether, polyoxypropylene mononoylphenyl ether, polyoxypropylene monolauryl ester and mixtures thereof.

13. The method of claim 6 wherein the oxyalkylene compound is a compound selected from the group consisting of polyoxyethylenephenyl formaldehyde condensate, polyoxyethylenemethylphenyl formaldehyde condensate, polyoxyethylenenonylphenyl formaldehyde condensate, polyoxyethylenecetylphenyl formaldehyde condensate, polyoxypropylenemethylphenyl formaldehyde condensate, polyoxypropylenenonylphenyl formaldehyde condensate, polyoxybutylenenonylphenyl formaldehyde condensate, oxyethylenephenol formaldehyde condensate and oxyethylenenonylphenol formaldehyde condensate.

14. The method of claim 8 wherein the metal salt is selected from the group consisting of lithium acetate, sodium acetate, sodium benzoate, sodium benzenesulfonate, sodium p-toluene-sulfonate, sodium alpha-naphthalene sulfonate, disodium succinate, disodium adipate, disodium phthalate, trisodium sulfophthalate, disodium naphthalenedisulfonate, and trisodium trimellitate.

15. The method of claim 14 wherein the amount of the metal salt is from 0.1 to 2 moles, per 100 grams of polyphenylene sulfide.

* * * * *